US011503106B2

(12) United States Patent
Huang et al.

(10) Patent No.: US 11,503,106 B2
(45) Date of Patent: Nov. 15, 2022

(54) ELECTRONIC APPARATUS AND DATA TRANSMISSION METHOD THEREOF

(71) Applicant: Acer Incorporated, New Taipei (TW)

(72) Inventors: Yen-Shuo Huang, New Taipei (TW); Chih-Wen Huang, New Taipei (TW); Wen-Cheng Hsu, New Taipei (TW); Chao-Kuang Yang, New Taipei (TW); Ling-Fan Tsao, New Taipei (TW); Chueh-Pin Ko, New Taipei (TW); Chih-Chiang Chen, New Taipei (TW); Tai Ju, New Taipei (TW); Yu-Shan Ruan, New Taipei (TW); Yu-Chieh Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 55 days.

(21) Appl. No.: 16/934,021

(22) Filed: Jul. 21, 2020

(65) Prior Publication Data

US 2021/0185110 A1 Jun. 17, 2021

(30) Foreign Application Priority Data

Dec. 12, 2019 (TW) .................................. 108145544

(51) Int. Cl.
*G06F 15/16* (2006.01)
*H04L 67/06* (2022.01)
(Continued)

(52) U.S. Cl.
CPC .............. *H04L 67/06* (2013.01); *G06F 3/044* (2013.01); *H04L 63/08* (2013.01); *H04W 76/10* (2018.02); *G06V 10/10* (2022.01); *G06V 30/10* (2022.01)

(58) Field of Classification Search
None
See application file for complete search history.

(56) References Cited

U.S. PATENT DOCUMENTS

| 8,438,084 B1 * | 5/2013 | Tesler | G06Q 10/087 |
| | | | 705/29 |
| 2014/0223359 A1 * | 8/2014 | Yamada | G06F 1/1645 |
| | | | 715/798 |

(Continued)

FOREIGN PATENT DOCUMENTS

| CN | 102685318 | 11/2014 |
| TW | I576757 | 4/2017 |

*Primary Examiner* — Brian Whipple
*Assistant Examiner* — Gregory P Tolchinsky
(74) *Attorney, Agent, or Firm* — JCIPRNET

(57) ABSTRACT

An electronic apparatus and a data transmission method thereof are provided. The data transmission method is adapted to the electronic apparatus including a touch screen, and the data transmission method includes the following steps. An image frame is displayed through the touch screen. A connection with another electronic apparatus placed on the touch screen is established. Position information of said another electronic apparatus on the touch screen is detected through the touch screen, to capture a partial frame from the image frame according to the position information of said another electronic apparatus. Feature information of data to be transmitted is obtained from the partial frame. The data to be transmitted is sent to said another electronic apparatus via the connection according to the feature information.

8 Claims, 6 Drawing Sheets

(51) Int. Cl.
*H04W 76/10* (2018.01)
*H04L 9/40* (2022.01)
*G06F 3/044* (2006.01)
*G06V 10/10* (2022.01)
*G06V 30/10* (2022.01)

(56) References Cited

U.S. PATENT DOCUMENTS

| | | | |
|---|---|---|---|
| 2015/0294645 A1* | 10/2015 | Tagaya | G06F 1/1694 |
| | | | 345/173 |
| 2019/0026011 A1* | 1/2019 | Wang | G06F 3/0482 |
| 2019/0138063 A1* | 5/2019 | Xiao | G06F 1/1686 |
| 2020/0304516 A1* | 9/2020 | Lazar | G06F 16/183 |
| 2020/0364274 A1* | 11/2020 | Ferguson | G06F 16/24534 |

\* cited by examiner

ELECTRONIC APPARATUS AND DATA TRANSMISSION METHOD THEREOF

CROSS REFERENCE TO RELATED APPLICATION

This application claims the priority benefits of Taiwan application serial no. 108145544, filed on Dec. 12, 2019. The entirety of the above-mentioned patent application is hereby incorporated by reference herein and made a part of specification.

BACKGROUND

Field of the Disclosure

The present disclosure relates to an electronic apparatus, and more particularly, to an electronic apparatus and a data transmission method thereof.

Description of Related Art

With the vigorous development of information and communication technology, and the development of various electronic apparatuses and the advancement of various functions equipped with them, people are increasingly dependent on electronic apparatuses. Nowadays, almost everyone has a variety of different electronic apparatuses such as laptops, smart phones, mobile network devices or tablet computers, and it is common that a single user has multiple electronic apparatuses. Accordingly, it is common for users to transmit the data stored in one electronic apparatus to another one in order to perform further operation. Moreover, data sharing and transmission between electronic apparatuses can even create many practical and convenient applications.

In general, users need to perform multiple operating steps in order to transmit data stored in one electronic apparatus to another electronic apparatus. These operating steps include establishing a connection between apparatuses, marking text to be transmitted, or selecting files to be transmitted and so on. However, these tedious operation steps often make users feel troublesome and inconvenience in use. In other words, how to complete the data transmission between apparatuses through intuitive and convenient operations is an issue that needs to be discussed.

SUMMARY OF THE DISCLOSURE

In view of the foregoing, the present disclosure provides an electronic apparatus and a data transmission method thereof, which can improve the convenience and practicality of data transmission between electronic apparatuses, thereby providing a better user experience.

An embodiment of the present disclosure provides a data transmission method adaptable for an electronic apparatus including a touch screen. The method includes the following steps. An image frame is displayed through a touch screen. A connection with another electronic apparatus placed on the touch screen is established. Position information of said another electronic apparatus with respect to the touch screen is detected through the touch screen, thereby capturing a partial frame from the image frame according to the position information of said another electronic apparatus. Feature information of data to be transmitted is obtained from the partial frame. The data to be transmitted is sent to said another electronic apparatus via the connection according to the feature information.

An embodiment of the present disclosure provides an electronic apparatus, including a touch screen, a connection apparatus, a storage apparatus, and a processor. The touch screen is configured to display an image frame, and the storage apparatus stores a plurality of modules. The processor is coupled to the touch screen, the connection apparatus and the storage apparatus, and is configured to execute the module to perform the following steps. A connection with another electronic apparatus placed on the touch screen is established. Position information of said another electronic apparatus with respect to the touch screen is detected through the touch screen, thereby capturing a partial frame from the image frame according to the position information of said another electronic apparatus. Feature information of data to be transmitted is obtained from the partial frame. The data to be transmitted is sent to said another electronic apparatus via the connection according to the feature information.

Based on the foregoing, in the embodiment of the present disclosure, the touch screen of the electronic apparatus is configured to display an image frame and detect the placement position of another electronic apparatus on the touch screen. In this manner, the electronic apparatus can capture a partial frame from the image frame according to the placement position, and obtain the feature information of the data to be transmitted according to the frame content of the partial frame. Then, the electronic apparatus can send the data to be transmitted to another electronic apparatus according to the feature information presented in the partial frame. Accordingly, the user can select the data to be transmitted by placing said another electronic apparatus on the touch screen of the electronic apparatus, thereby significantly simplifying the operating steps of data transmission between apparatuses and improving the convenience of using the electronic apparatus.

In order to make the above features of the present disclosure more comprehensible, the following embodiments are described in detail with reference to the accompanying drawings.

DESCRIPTION OF EMBODIMENTS

Some embodiments of the present disclosure will be described in detail with reference to the accompanying drawings. The reference symbols in the following description will be regarded as the same or similar components when the same reference symbols appear in different drawings. These embodiments are only a part of the present disclosure and do not disclose all the possible embodiments of the present disclosure. Rather, these embodiments are merely examples of the method and apparatus claimed in the claims of the present disclosure.

Figure 1:
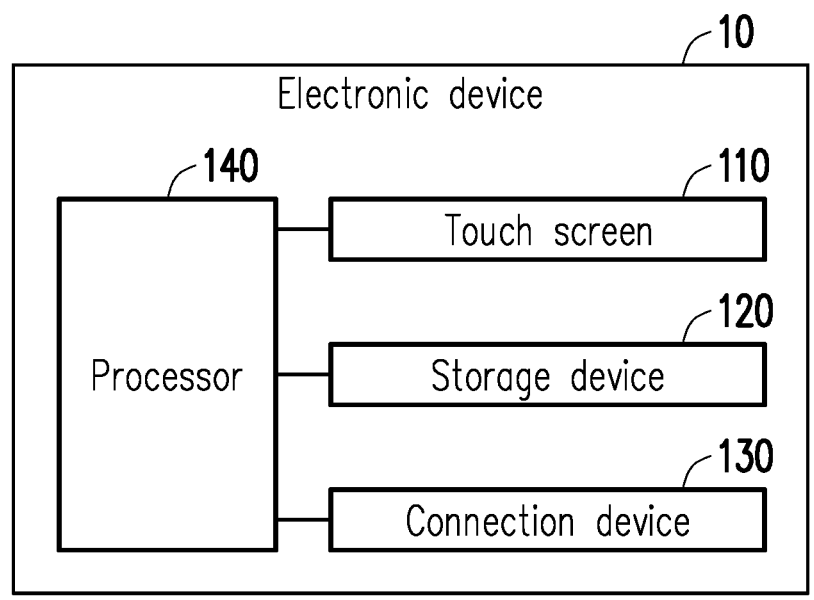
FIG. 1 is a schematic view of an electronic apparatus according to an embodiment of the disclosure.

FIG. 1 is a schematic view of an electronic apparatus according to an embodiment of the disclosure, which is only for convenience of explanation, and is not used to limit the present disclosure. Please refer to FIG. 1. An electronic apparatus 10 includes a touch screen 110, a storage apparatus 120, a connection apparatus 130, and a processor 140. The electronic apparatus 10 may be an electronic apparatus with a touch screen, such as a smart phone, a personal digital assistant, a tablet computer, a digital camera, an e-book, or a game console. The present disclosure is not limited thereto.

The touch screen 110 is a display apparatus with an integrated touch panel, which can provide both display and input functions. The display apparatus is, for example, a liquid crystal display (LCD), a light-emitting diode (LED) display, a field emission display (FED), an organic light-emitting diode (OLED) display or other types of displays, and the types of the touch panel are, for example, resistive touch screens, capacitive touch screens, or optical touch screens, the disclosure is not limited thereto. The touch screen 110 includes a plurality of touch sensing units arranged in an array and can perform touch sensing to obtain a touch sensing frame including touch raw data respectively corresponding to the touch sensing units. For example, a capacitive touch panel includes a plurality of capacitive sensors. The frame size of the touch sensing frame is determined based on the number of touch sensing units.

The storage apparatus 120 is configured to store touch data, instructions, program codes, software components, etc., and which may be, for example, any type of fixed or removable random access memory (RAM), read-only memory (ROM), flash memory, hard disk or other similar apparatuses, integrated circuits, and combinations thereof.

The connection apparatus 130 is configured to establish a wireless communication connection, so that the electronic apparatus 10 can be connected to other mobile electronic apparatuses via a wireless network. The wireless communication connection is classified according to the type of the communication network, and may include a wireless personal area network (WPAN) or a wireless local area network (WLAN), the present disclosure is not limited thereto. Specifically, the WPAN, for example, establishes a connection based on IEEE 802.15 standard; the WLAN, for example, establishes a connection based on IEEE 802.11 standard. Further, the connection apparatus 130 may be a component supporting Bluetooth wireless communication technology of the WPAN, or may be a component supporting wireless fidelity (Wi-Fi) communication technology of the WLAN, the present disclosure is not limited thereto.

The processor 140 is coupled to the touch screen 110, the storage apparatus 120, and the connection apparatus 130, and is configured to control the actuation between the components of the electronic apparatus 10. The processor 140, for example, is a central processing unit (CPU), or other programmable general-purpose or specific-purpose microprocessor, a digital signal processor (DSP), a programmable controller, an application specific integrated circuit (ASIC), a programmable logic device (PLD), a graphics processing unit (GPU) or other similar apparatuses or a combination of these apparatuses. The processor 140 may execute program codes, software modules, instructions, etc. recorded in the storage apparatus 120 to implement the data transmission method of the embodiment of the present disclosure. It should be noted that, in an embodiment, the touch screen 110 can be connected to the processor 140 through a touch IC to provide the touch sensing frames generated by the touch screen 110 to the processor 140.

However, in addition to the touch screen 110, the storage apparatus 120, the connection apparatus 130, and the processor 140, the electronic apparatus 10 may also include other components not shown in FIG. 1, such as a speaker, a microphone, a camera, a keyboard and so on, the present disclosure is not limited thereto.

Figure 2:
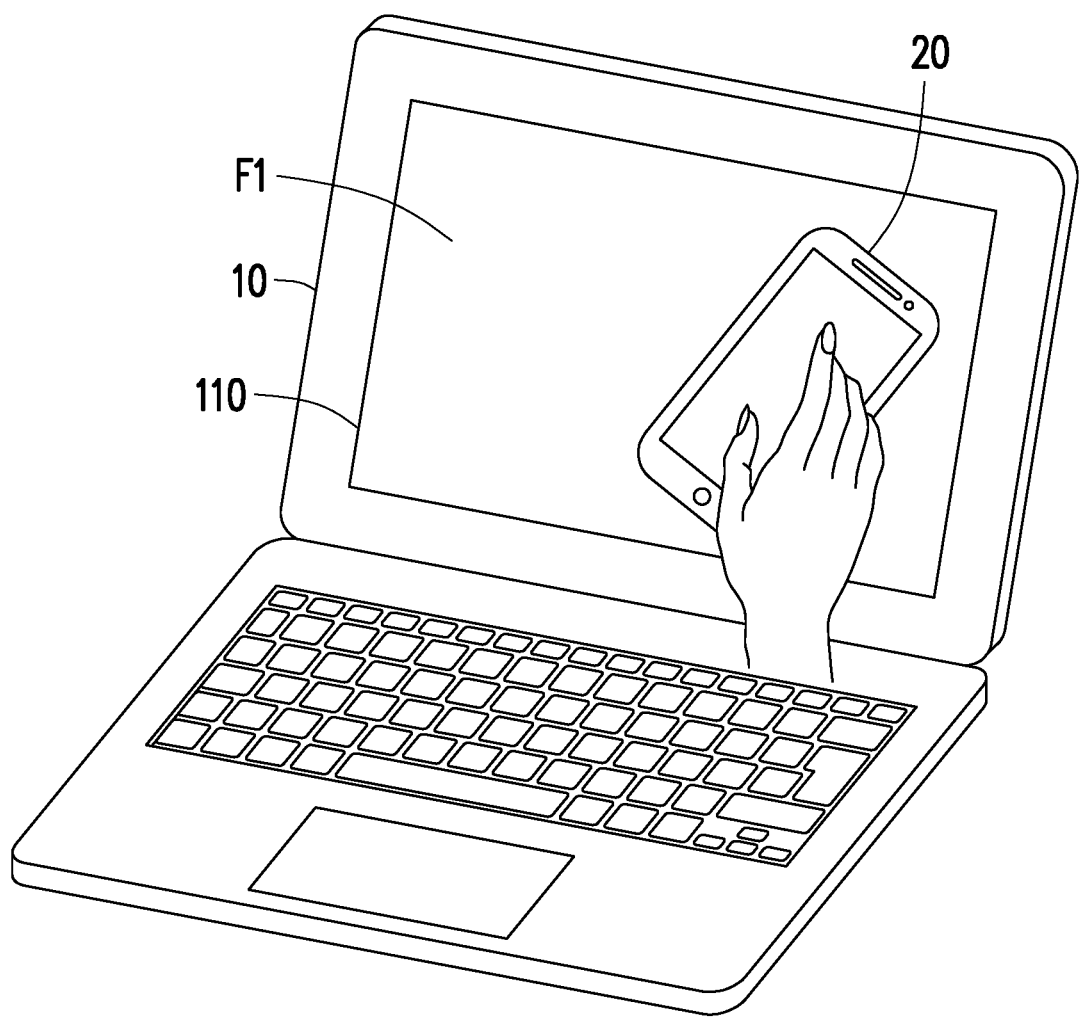
FIG. 2 is a schematic view showing a scenario in which two electronic apparatuses perform data transmission according to an embodiment of the present disclosure.

FIG. 2 is a schematic view showing a scenario in which two electronic apparatuses perform data transmission according to an embodiment of the present disclosure. Please refer to FIG. 2. In an embodiment, the electronic apparatus 10 as the data sending terminal is, for example, a notebook computer with the touch screen 110, and the electronic apparatus 20 as the data receiving terminal is, for example, a mobile phone. When the user wants to send the data in the electronic apparatus 10 to the electronic apparatus 20, the user can place the electronic apparatus 20 on the touch screen 110. In an embodiment, when the electronic apparatus 20 can be actually in touch with the touch screen 110 or be close enough to the touch screen 110 (suspended on the touch screen 110), the touch raw data generated by the touch sensing unit of the touch screen 110 can be correspondingly changed in response to the presence of the electronic apparatus 20.

In an embodiment, the touch screen 110 may display an image frame F1 including a plurality of file icons or web addresses, and the user may select the data to be transmitted by placing the electronic apparatus 20 at a specific position on the touch screen 110. Specifically, the electronic apparatus 10 can identify the position information of the electronic apparatus 20 relative to the touch screen 110 according to the touch raw data generated by the touch screen 110. In this manner, based on the coverage range of the electronic apparatus 20 covering the touch screen 110, the electronic apparatus 10 can obtain the feature information of the data to be transmitted selected by the user from the current image frame F1 of the touch screen 110, such as a file name or a website address and so on. Accordingly, in response to the user placing the electronic apparatus 20 on the touch screen 110, the electronic apparatus 10 can send the data to be transmitted selected by the user to the electronic apparatus 20.

Figure 3:
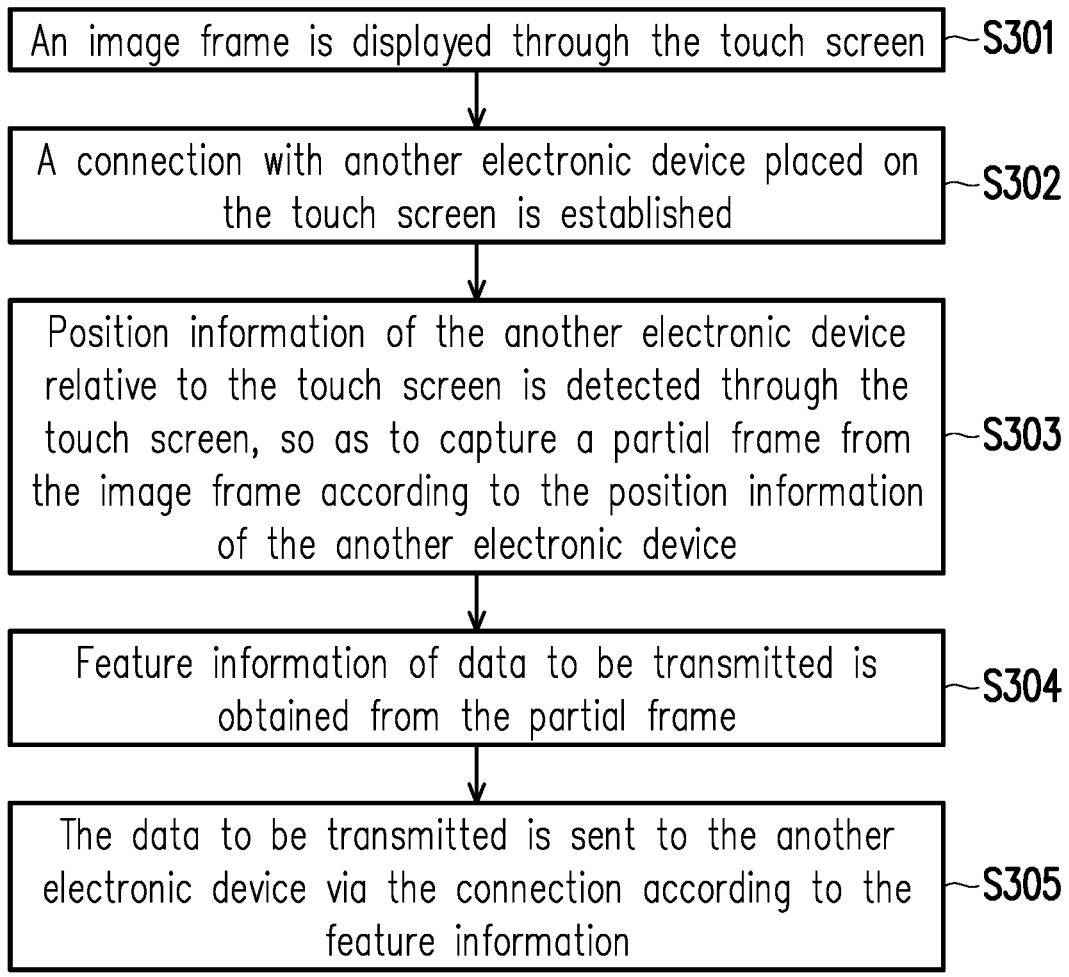
FIG. 3 is a flowchart diagram of a data transmission method according to an embodiment of the present disclosure.

In order to further explain the data transmission method of the electronic apparatus, an embodiment is described below to illustrate the present disclosure. FIG. 3 is a flowchart diagram of a data transmission method according to an embodiment of the present disclosure. Please refer to FIG. 1 and FIG. 3 both. The method of this embodiment is adapted to the electronic apparatus 10 in FIG. 1. The following describes the detailed process of the method of this embodiment with reference to various components in the electronic apparatus 10.

In step S301, the processor 140 displays the image frame F1 through the touch screen 110. The image frame F1 can be a wallpaper frame or an application frame, which is not limited in the present disclosure. In an embodiment, the image frame F1 may display file icons and file names of multiple files, or the image frame F1 may display complete or partial website address.

When the user wants to send the file or website address in the image frame F1 to the electronic apparatus 20, the user can place the electronic apparatus 20 on the touch screen 110. Specifically, when the electronic apparatus 20 is placed on the touch screen 110, the metal elements of the electronic apparatus 20 can change the touch raw data output by the touch sensing element, so the processor 140 can identify the apparatus information of the electronic apparatus 20 according to the touch sensing frame generated by the touch screen 110. The above object information is, for example, the apparatus model, the apparatus location, the location of the components of the electronic apparatus 20, or other information, etc. The above touch sensing frame includes the touch raw data generated by various touch sensing elements, and can also be regarded as a data array.

For example, the processor 140 may input the touch sensing frame to a machine learning model to obtain the apparatus information of the electronic apparatus 20, and the machine learning model may be a machine learning model that is constructed in advance for machine learning based on the training touch frame, and which can be stored in the storage apparatus 120. In other words, the model parameters of the machine learning model (such as the number of neural network layers and the weight of each neural network layer, etc.) can be determined through prior training and stored in the storage apparatus 120. In an embodiment, during the machine learning model training phase, a variety of electronic apparatuses can be freely placed on the touch screen 110 to obtain multiple training touch frames. Then, the answer objects in these training touch frames are selected and given answer information to establish a machine learning model based on the multiple marked answer objects on the training touch frames and the corresponding answer information.

In step S302, the processor 140 establishes a connection with another electronic apparatus 20 placed on the touch screen 110 through the connection apparatus 130. In an embodiment, the electronic apparatus 10 can establish a wireless communication connection with the electronic apparatus 20 through Bluetooth communication technology. Or, in an embodiment, the electronic apparatus 10 can automatically establish a wireless communication connection with the electronic apparatus 20 in response to detecting that the electronic apparatus 20 is placed on the touch screen 110. Specifically, the processor 140 can identify the position of the camera lens of the electronic apparatus 20 above the touch screen 110 according to the touch sensing frame generated by the touch screen 110. Then, the touch screen 110 can display connection information at the position of the camera lens, so that the camera of the electronic apparatus 20 can capture the connection information displayed by the touch screen 110. The above connection information is, for example, the IP address or MAC address of the electronic apparatus 10, etc. For example, the processor 140 may use color coding to encode the connection information into a combination of multiple colors, and use the touch screen 110 to continuously display these colors at the location of the camera lens. In this manner, the electronic apparatus 20 can decode the connection information according to these colors captured by the camera, and establish a connection with the electronic apparatus 10 with the enabled hotspot function through the WIFI communication technology.

In step S303, the processor 140 detects the position information of said another electronic apparatus 20 relative to the touch screen 110 through the touch screen 110, so as to capture a partial frame from the image frame F1 according to the position information of said another electronic apparatus 20. Based on the foregoing, in response to the electronic apparatus 20 being placed on the touch screen 110, the processor 140 can obtain the position information of the electronic apparatus 20 relative to the touch screen 110. Specifically, the processor 140 may obtain the position information of the electronic apparatus 20 according to the touch raw data generated by various touch sensing units. In an embodiment, the processor 140 may obtain the coverage range of the electronic apparatus 20 covering the touch screen 110 according to the touch raw data, and the position information includes the coordinate positions of multiple corner points of the coverage range. In an embodiment, the processor 140 may input the touch sensing frame to a machine learning model, and the output of the machine learning model includes a bonding box for marking the electronic apparatus 20, and the bonding box can be regarded as the coverage range of the electronic apparatus 20. After that, the processor 140 may capture a partial frame from the image frame F1 according to the coverage range of the electronic apparatus 20. For example, the processor 140 may use the screenshot function to capture a partial frame from the image frame F1 according to the coordinates of the four corner points of the bonding box. More specifically, the processor 140 may obtain the touch position information of the electronic apparatus 20 according to the touch sensing frame, and convert this touch position information into screen coordinate information of the touch screen 110 to capture partial frame according to the screen coordinate information.

In step S304, the processor 140 obtains the feature information of the data to be transmitted from the partial frame. Specifically, the processor 140 may perform text identification or image identification on a partial frame framed by the electronic apparatus 20, thereby obtaining the feature information of data to be transmitted. The feature information of the data to be transmitted is, for example, file name, website address, photo thumbnail feature, etc.

In step S305, the processor 140 sends the data to be transmitted to said another electronic apparatus 20 via the connection according to the feature information. In detail, after obtaining the feature information of the data to be transmitted, the processor 140 may know the data to be transmitted selected by the user, and transmit the data to be transmitted to the electronic apparatus 20 through a wireless communication connection with the electronic apparatus 20. For example, the processor 140 may transmit the data to be transmitted to the electronic apparatus 20 through the connection apparatus 130 by using a socket connection specified by TCP session. Based on the flow in FIG. 3, it can be seen that the user can select the data to be transmitted by placing the electronic apparatus 20 on the touch screen 110.

Figure 4:
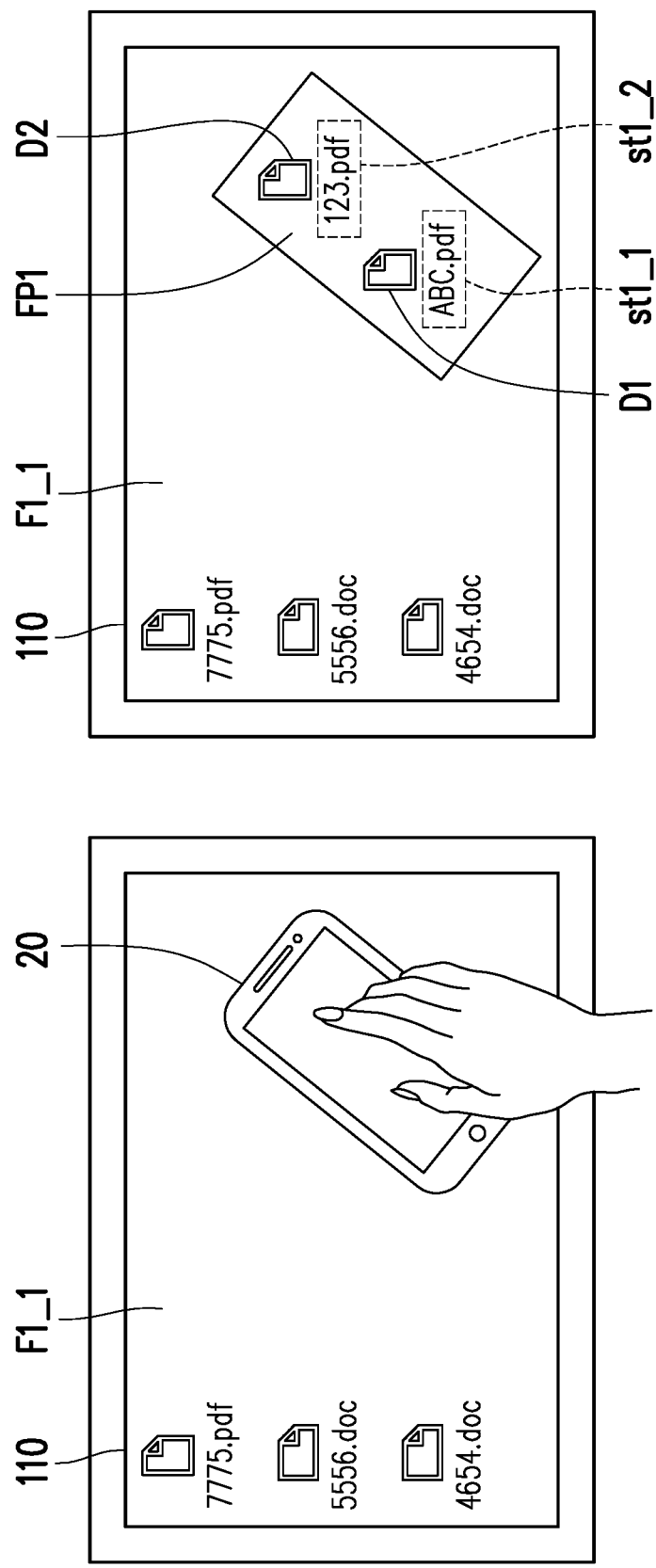
FIG. 4 is a schematic view showing an application scenario of a data transmission method according to an embodiment of the present disclosure.

FIG. 4 is a schematic view showing an application scenario of a data transmission method according to an embodiment of the present disclosure. In the example of FIG. 4, the data to be transmitted may be a file, which may be any type of file, which is not limited in the present disclosure. For example, the data to be transmitted can be document files, image files, music files, video files, program files, etc. Please refer to FIG. 4, the touch screen 110 displays a wallpaper frame F1_1, and the wallpaper frame F1_1 displays file icons and file names of multiple files. When the electronic apparatus 20 is placed on the touch screen 110, the electronic apparatus 10 can detect the position information of the electronic apparatus 20 according to the touch screen 110. Based on the above, the electronic apparatus 10 can capture the partial frame FP1 from the wallpaper frame F1_1 based on the position information (for example, 4 coordinate positions) of the electronic apparatus 20. Here, the partial frame FP1 includes the file icons and file names of two files D1 and D2. Therefore, by performing text identification on the partial frame FP1, the electronic apparatus 10 can obtain two strings st1_1 and st1_2, which are the file name "ABC.pdf" and the file name "123.pdf". The electronic apparatus 10 can use the application program interface (API) of the operating system to obtain the file path locations of the files D1 and D2 according to the file name "ABC.pdf" and the file name "123.pdf", and transmit the files D1 and D2 or one of the files D1 and D2 to the electronic apparatus 20. In an embodiment, when the partial frame includes file icons and file names of multiple files, the electronic apparatus 10 or the electronic apparatus 20 may be used to display a prompt box to allow the user to select one of the files D1 and D2.

Figure 5:
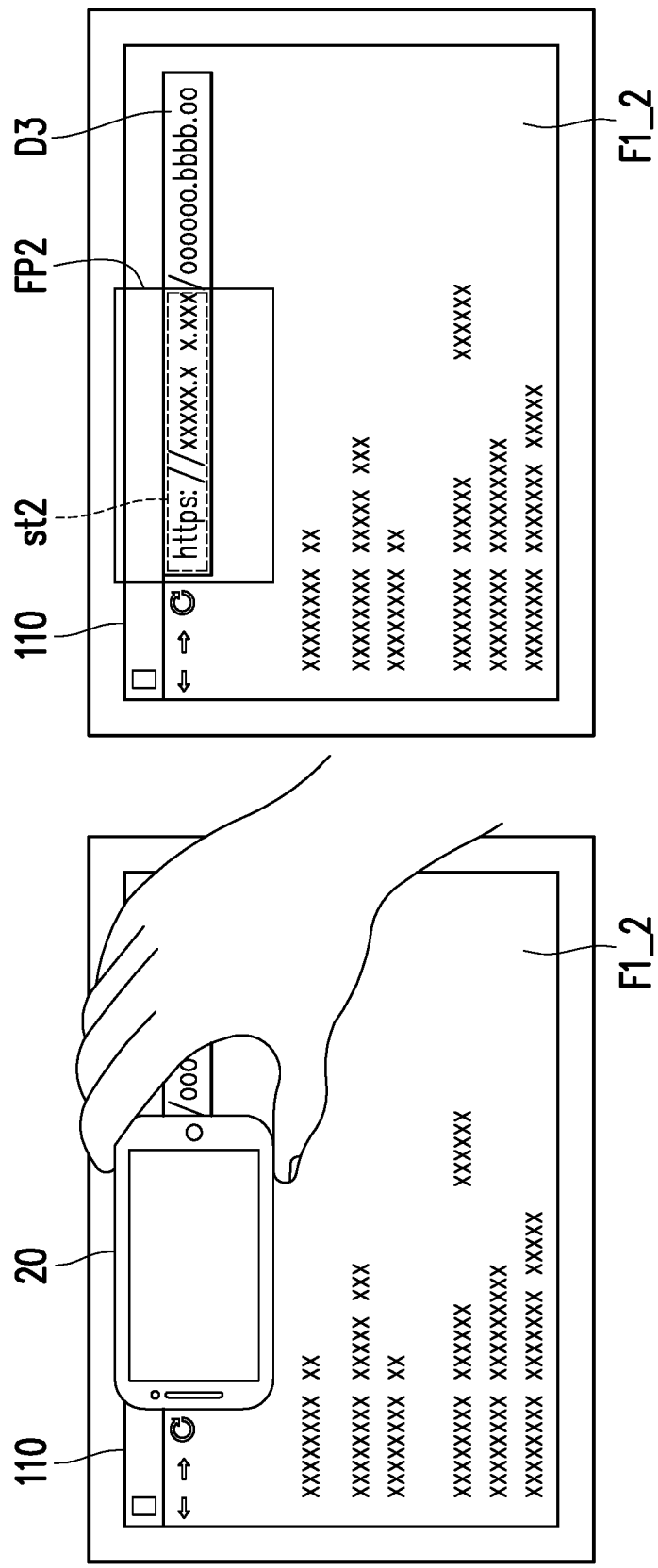
FIG. 5 is a schematic view showing an application scenario of a data transmission method according to an embodiment of the present disclosure.

FIG. 5 is a schematic view showing an application scenario of a data transmission method according to an embodiment of the present disclosure. In the example of FIG. 5, the data to be transmitted can be a website address. Please refer to FIG. 5, the touch screen 110 displays an application frame F1_2, and the application frame F1_2 is a browser frame with a website address input field. When the electronic apparatus 20 is placed on the touch screen 110, the electronic apparatus 10 can detect the position information of the electronic apparatus 20 according to the touch screen 110. Based on this, the electronic apparatus 10 can capture the partial frame FP2 from the application frame F1_2 according to the position information of the electronic apparatus 20. Here, the partial frame FP2 includes the partial content of the website address D3. Therefore, by performing text identification and keyword identification on the partial frame FP2, the electronic apparatus 10 can obtain a string st2 including the keyword "https", and the string st2 may include a partial or complete website address. In this example, the string st2 is partial content of the website address "http://xxxxx.x x.xxx". Accordingly, the electronic apparatus 10 searches for the complete website address D3 from the original code of the webpage according to the partial content of the website address "http://xxxxx.x x.xxx", and sends the complete website address D3 to the electronic apparatus 20.

It is worth mentioning that the implementation of the present disclosure is not limited to the above description, and the content of the above embodiments may be changed as appropriate to adapt to actual needs. For example, in order to ensure data security, the electronic apparatus 10 may perform user authentication on the electronic apparatus 20 or decide whether to transmit data according to the confidentiality of the data. The following embodiment of the present disclosure is provided to describe the steps of data transmission between electronic apparatuses in detail.

Figure 6:
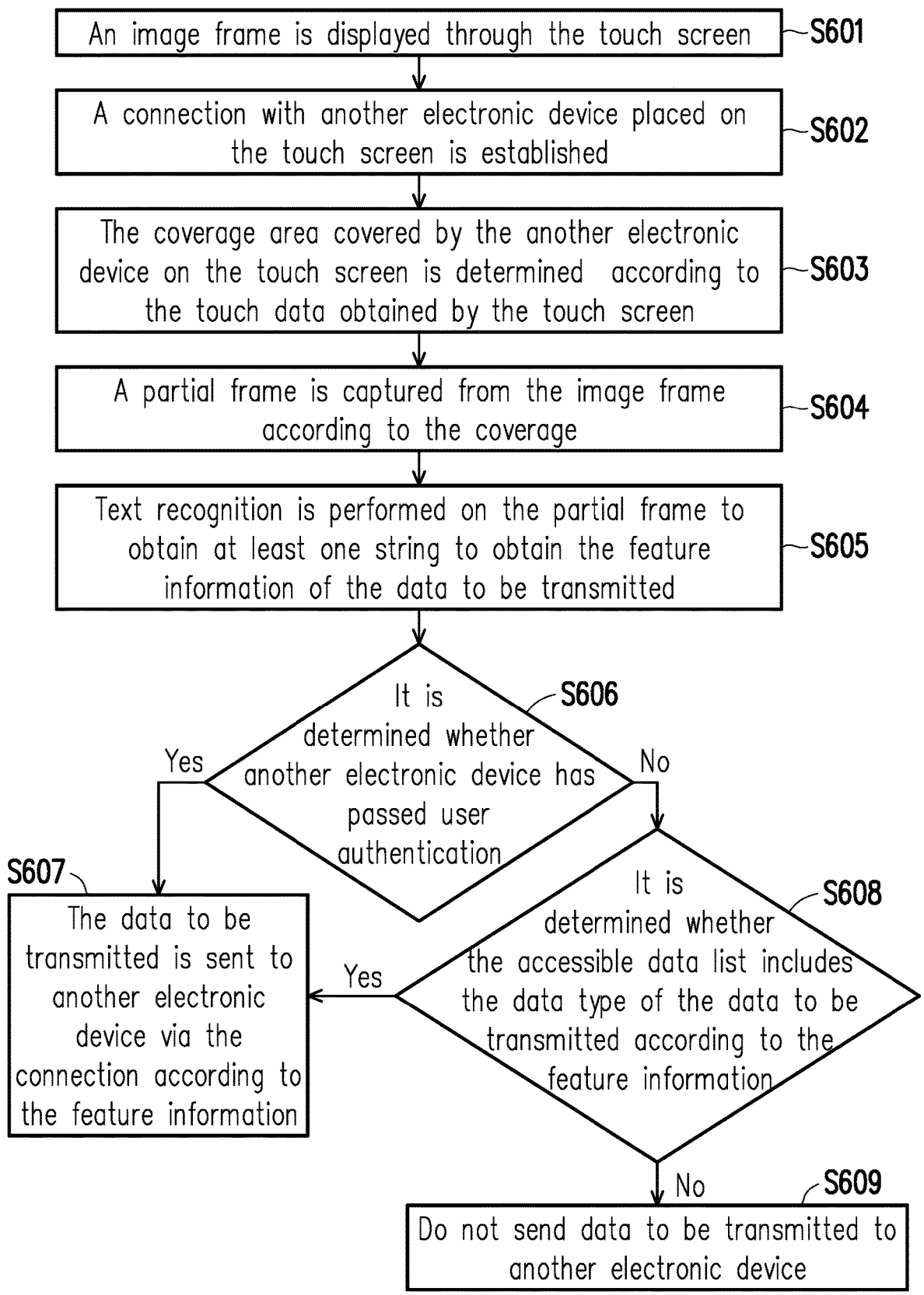
FIG. 6 is a flowchart diagram of a data transmission method according to an embodiment of the present disclosure.

FIG. 6 is a flowchart diagram of a data transmission method according to an embodiment of the present disclosure. Please refer to FIG. 1 and FIG. 6 both. The method of this embodiment is adapted to the electronic apparatus 10 in FIG. 1. The following describes the detailed process of the method of this embodiment with reference to various components in the electronic apparatus 10.

In step S601, the processor 140 displays the image frame F1 through the touch screen 110. In step S602, the processor 140 establishes a connection with another electronic apparatus 20 placed on the touch screen 110 through the connection apparatus 130. In step S603, the processor 140 determines the coverage range covered by said another electronic apparatus 20 covering the touch screen 110 based on the touch data obtained by the touch screen 110. In step S604, the processor 140 captures a partial frame from the frame image F1 according to the coverage range. In step S605, the processor 140 performs text identification on the partial frame to obtain at least one string to obtain the feature information of the data to be transmitted. The implementation details of steps S601 to S605 have been clearly described in the foregoing embodiment, and will not be repeated here.

In step S606, the processor 140 determines whether said another electronic apparatus 20 has passed the user authentication. In other words, the processor 140 can determine whether the electronic apparatus 20 is owned by a specific authenticated user according to the authentication information (such as a MAC address or other unique identification code, etc.) of the electronic apparatus 20, and the above authentication information may be provided to the processor 140, for example, during a connection establishment phase. In an embodiment, the processor 140 determines whether the authentication information provided by the electronic apparatus 20 matches the qualified authentication information recorded by the storage apparatus 120, and determines whether said another electronic apparatus 20 passes user authentication.

In response to said another electronic apparatus 20 passing the user authentication, in step S607, the processor 140 sends the data to be transmitted to said another electronic apparatus 20 via the connection according to the feature information. In response to said another electronic apparatus 20 failing to pass user authentication, in step S608, the processor 140 determines whether the accessible data list includes the data type of the data to be transmitted according to the feature information. Table 1 is an example of an accessible data list, but which is not intended to limit the present disclosure.

TABLE 1

| | Accessible data types |
|---|---|
| 1 | Compressed file |
| 2 | PDF file |
| 3 | Image file |
| 4 | website address |

Based on the example in Table 1, the processor 140 will determine whether the data type of the data to be transmitted is a compressed file, a PDF file, an image file, or a website address, thereby deciding whether to transmit the data to be transmitted to the electronic apparatus 20. That is, in response to the accessible data list including the data type of data to be transmitted, returning to step S607, the processor 140 sends the data to be transmitted to said another electronic apparatus 20 via the connection according to the feature information. In contrast, in response to the fact that the accessible data list does not include the data type of the data to be transmitted, in step S609, the processor 140 does not send the data to be transmitted to said another electronic apparatus 20. It should be particularly noted that the above-mentioned accessible data list and qualified authentication information that can pass user authentication can be established in the storage apparatus 120 through initialization settings.

In summary, in the embodiment of the present disclosure, by bringing another electronic apparatus into contact with or close enough to the touch screen of an electronic apparatus, the electronic apparatus can accurately identify the apparatus information related to said another electronic apparatus according to the touch data. Based on this, by placing said another electronic apparatus on the touch screen of an electronic apparatus, not only that the two electronic apparatuses can automatically establish a connection, but also the data to be transmitted can be selected based on the coverage range of said another electronic apparatus on the touch screen, thus eliminating the tedious steps of manually setting up the connection and selecting the data to be transmitted, thereby improving the efficiency and convenience of data transmission between apparatuses. In addition, by setting the accessible data list and user authentication, the security of data transmission can be improved.

Although the present disclosure has been disclosed in the above embodiments, it is not intended to limit the present disclosure, and those skilled in the art can make some modifications and refinements without departing from the spirit and scope of the disclosure. Therefore, the scope of the present disclosure is subject to the definition of the scope of the appended claims.

What is claimed is:

1. A data transmission method adaptable for an electronic apparatus comprising a touch screen, the method comprising:

displaying an image frame through the touch screen;

establishing a connection with another electronic apparatus placed on the touch screen;

detecting position information of said another electronic apparatus relative to the touch screen through the touch screen, so as to capture a partial frame from the image frame displayed on the touch screen according to the position information of said another electronic apparatus;

obtaining feature information, by performing text identification on the partial frame, of a data to be transmitted from the partial frame; and sending the data to be transmitted to said another electronic apparatus via the connection according to the feature information, wherein the step of detecting the position information of said another electronic apparatus relative to the touch screen through the touch screen, so as to capture the partial frame from the image frame according to the position information of said another electronic apparatus comprises:

determining a coverage range covered by said another electronic apparatus covering the touch screen according to touch data obtained by the touch screen; and capturing the partial frame from the image frame according to the coverage range, wherein the position information comprises coordinate positions of a plurality of corner points of the coverage range, wherein the step of sending the data to be transmitted to said another electronic apparatus via the connection according to the feature information comprises:

determining whether said another electronic apparatus has passed user authentication;

in response to said another electronic apparatus passing the user authentication, the data to be transmitted is sent to said another electronic apparatus via the connection according to the feature information;

in response to said another electronic apparatus failing to pass the user authentication, it is determined whether an accessible data list comprises a data type of the data to be transmitted according to the feature information;

in response to the accessible data list comprising the data type of the data to be transmitted, the data to be transmitted is sent to said another electronic apparatus via the connection according to the feature information; and in response to that the accessible data list does not comprise the data type of the data to be transmitted, the data to be transmitted is not sent to said another electronic apparatus.

2. The data transmission method according to claim 1, wherein the image frame comprises a wallpaper frame or an application frame.

3. The data transmission method according to claim 1, wherein the data to be transmitted comprises a website address, and the step of obtaining the feature information of the data to be transmitted from the partial frame comprises:

obtaining at least one string by performing text identification on the partial frame, where the at least one string comprises the partial or complete website address.

4. The data transmission method according to claim 1, wherein the data to be transmitted comprises a file, and the step of obtaining the feature information of the data to be transmitted from the partial frame comprises:

obtaining at least one string by performing text identification on the partial frame, wherein the at least one string comprises a file name of the file.

5. An electronic apparatus, comprising:

a touch screen displaying an image frame;

a storage apparatus storing a plurality of modules; and a processor coupled to the touch screen and the storage apparatus, and configured to execute the modules to:

establish a connection with another electronic apparatus placed on the touch screen;

detect position information of said another electronic apparatus relative to the touch screen through the touch screen, so as to capture a partial frame from the image frame displayed on the touch screen according to the position information of said another electronic apparatus;

obtain feature information, by performing text identification on the partial frame, of a data to be transmitted from the partial frame; and send the data to be transmitted to said another electronic apparatus via the connection according to the feature information, wherein the processor is configured to:

determine a coverage range covered by said another electronic apparatus covering the touch screen according to touch data obtained by the touch screen; and capture the partial frame from the image frame according to the coverage range, wherein the position information comprises coordinate positions of a plurality of corner points of the coverage range, wherein the processor is configured to: determine whether said another electronic apparatus has passed user authentication; and in response to said another electronic apparatus passing the user authentication, the data to be transmitted is sent to said another electronic apparatus via the connection according to the feature information, wherein the processor is configured to: in response to said another electronic apparatus failing to pass the user authentication, it is determined whether an accessible data list comprises a data type of the data to be transmitted according to the feature information; in response to the accessible data list comprising the data type of the data to be transmitted, the data to be transmitted is sent to said another electronic apparatus via the connection according to the feature information; and in response to that the accessible data list does not comprise the data type of the data to be transmitted, the data to be transmitted is not sent to said another electronic apparatus.

6. The electronic apparatus according to claim 5, wherein the image frame comprises a wallpaper frame or an application frame.

7. The electronic apparatus according to claim 5, wherein the data to be transmitted comprises a website address, and the processor is configured to: perform text identification on the partial frame to obtain at least one string, wherein the at least one string comprises the partial or complete website address.

8. The electronic apparatus according to claim 5, wherein the data to be transmitted comprises a file, and the processor is configured to: perform text identification on the partial frame to obtain at least one string, wherein the at least one string comprises a file name of the file.

* * * * *